US008882426B2

(12) United States Patent
Horst et al.

(10) Patent No.: US 8,882,426 B2
(45) Date of Patent: Nov. 11, 2014

(54) FASTENER COATING FORMULATION

(75) Inventors: Christopher A. Horst, Antioch, IL (US);
Jyi-Jiin Luo, Morton Grove, IL (US);
Wen-Feng Liu, Naperville, IL (US);
Daniel V. Chin, St. Charles, IL (US);
Daniel P. Birr, Crystal Lake, IL (US)

(73) Assignee: Illinois Tool Works Inc., Glenview, IL (US)

( * ) Notice: Subject to any disclaimer, the term of this patent is extended or adjusted under 35 U.S.C. 154(b) by 427 days.

(21) Appl. No.: 13/218,261

(22) Filed: Aug. 25, 2011

(65) Prior Publication Data

US 2012/0057950 A1 Mar. 8, 2012

Related U.S. Application Data

(60) Provisional application No. 61/380,565, filed on Sep. 7, 2010.

(51) Int. Cl.
*F16B 15/08* (2006.01)

(52) U.S. Cl.
USPC .......................................... 411/443; 411/903

(58) Field of Classification Search
USPC .......................................... 411/443, 903, 914
IPC .................................................... F16B 15/0092
See application file for complete search history.

(56) References Cited

U.S. PATENT DOCUMENTS

| 3,639,137 | A |   | 2/1972 | Marinelli |
| 3,893,496 | A |   | 7/1975 | Wallace et al. |
| 4,074,011 | A | * | 2/1978 | Teramae et al. ............... 428/422 |
| 4,345,004 | A | * | 8/1982 | Miyata et al. ................. 428/416 |
| 4,407,893 | A | * | 10/1983 | Malizio ......................... 428/454 |
| 4,664,733 | A | * | 5/1987 | Masago ......................... 156/212 |
| 4,888,214 | A | * | 12/1989 | Duffy et al. ................... 427/183 |
| 5,260,100 | A |   | 11/1993 | Day |
| 5,283,280 | A | * | 2/1994 | Whyte et al. ................... 524/559 |
| 5,603,818 | A |   | 2/1997 | Brent et al. |
| 5,618,372 | A | * | 4/1997 | Erdrich et al. ................. 156/310 |
| 5,733,085 | A | * | 3/1998 | Shida et al. ................... 411/442 |
| 5,741,104 | A |   | 4/1998 | Lat et al. |
| 5,749,692 | A |   | 5/1998 | Kish et al. |
| 6,436,474 | B2 | * | 8/2002 | Godsted et al. ............... 427/318 |
| 6,672,498 | B2 |   | 1/2004 | White et al. |
| 7,273,337 | B2 |   | 9/2007 | Lat et al. |
| 7,395,925 | B2 |   | 7/2008 | Sutt, Jr. |

(Continued)

FOREIGN PATENT DOCUMENTS

| EP | 0505708 | 9/1992 |
| EP | 1022474 | 7/2000 |
| GB | 1149944 | 4/1969 |
| GB | 1382611 | 2/1975 |

OTHER PUBLICATIONS

International Search Report for PCT/US2011/050605 dated Dec. 6, 2011.

*Primary Examiner* — Gary Estremsky
(74) *Attorney, Agent, or Firm* — Levenfeld Pearlstein, LLC

(57) ABSTRACT

A coated fastener has a tip and a coating on the fastener, at least at the tip. The coating is formulated from a solvent-borne resin. The fastener includes one or both of a solids based additive in the solvent-borne acrylic resin and an overcoat on the solvent-borne acrylic resin. A strip of collated fasteners with the coating is also disclosed.

21 Claims, 1 Drawing Sheet

(56) References Cited

U.S. PATENT DOCUMENTS

| | | | |
|---|---|---|---|
| 7,641,432 B2* | 1/2010 | Lat et al. | 411/443 |
| 7,842,403 B2* | 11/2010 | Meyer et al. | 428/686 |
| 2006/0228575 A1* | 10/2006 | Klos | 428/621 |
| 2007/0027232 A1 | 2/2007 | Walsh, Jr. et al. | |
| 2007/0264102 A1 | 11/2007 | Shelton et al. | |
| 2009/0047092 A1 | 2/2009 | Peffer | |
| 2010/0266367 A1 | 10/2010 | Lat et al. | |

* cited by examiner

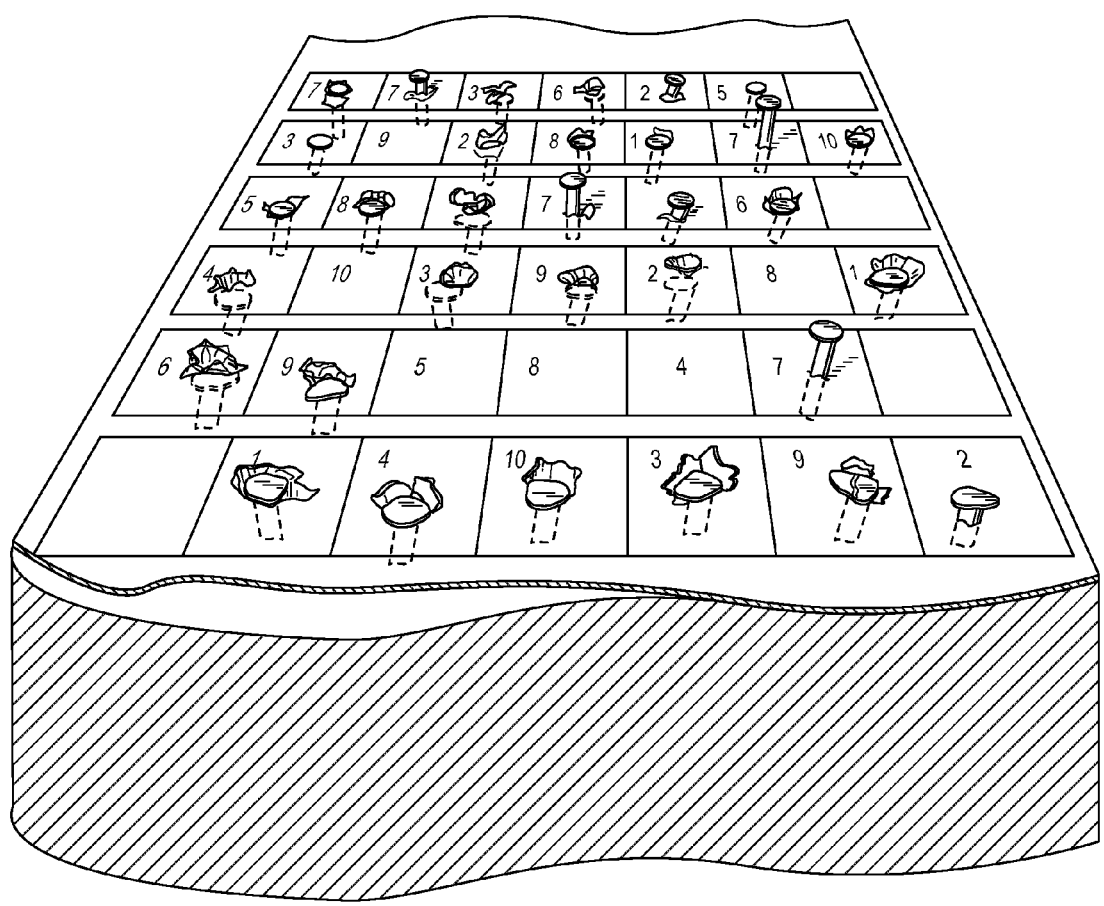

FASTENER COATING FORMULATION

CROSS-REFERENCE TO RELATED APPLICATION DATA

This application claims the benefit of U.S. Provisional Patent Application Ser. No. 61/380,565, filed Sep. 7, 2010.

BACKGROUND

Powered drivers are used to drive fasteners in today's construction industries. In the home construction industry, use of engineered lumber is on the rise. One such material is laminated veneer lumber (LVL). LVL is a very hard material and as such is a difficult material into which to power drive a fastener, such as a nail.

Another material is coming into use, laminated strand lumber (LSL), that is even harder and more dense than LVL and is more difficult to drive fasteners into than LVL.

Powered nailers (combustion, cordless, and the like) have to be sufficiently powerful to drive nails into these materials. This is exaggerated by the use of longer nails, which use is on the rise for improved construction quality and in order to meet building code requirements.

Fastener coatings, such as that disclosed in Lat, U.S. patent application Ser. No. 12/760,232, commonly assigned with the present disclosure and which is incorporated herein by reference, were formulated to ease driving fasteners into such hard, engineered products. These coatings provide ease of driving for powered nailers. However, the power required to drive nails is still high and in the case of cordless nailers, tool power is reduced with increased tool temperature which results in incomplete nail drive—that is, the nail remains standing above the surface of the substrate.

Accordingly, there is a need for a fastener coating chemistry that further reduces the force needed to drive a fastener, such as a nail, into a substrate. Desirably, such a coating does not adversely effect the holding power of the fastener.

BRIEF SUMMARY

An ease of drive coating for a fastener is formulated from a resin, such as a solvent-borne resin. The resin can be a solvent-borne acrylic resin. One suitable is an acrylic copolymer of butyl/methyl methacrylate.

The solvent-borne resin is in a solvent that is preferably an organic solvent, such as acetone. The acetone is present in a concentration of about 60 percent to about 90 percent of the weight of the coating formulation, preferably a concentration of about 75 percent to about 80 percent of the weight of the coating formulation.

Optionally, the solvent-borne resin includes a solids additive. One such solids additive is a micronized polyolefin, such as micronized polypropylene. Preferably, the micronized polyolefin is present in a concentration of about 0 percent to about 6.0 percent by weight of the coating formulation.

Alternatively, the solids additive is a wax, such as a carnauba wax, preferably, a modified carnauba wax. The wax can be a polytetrafluoroethylene (PTFE) modified carnauba wax. The PTFE modified carnauba wax is present in a concentration of about 0 percent to about 10.0 percent by weight of the coating formulation.

Optionally still, the solvent-borne resin coated fastener, with or without the solids additive can include an overcoat on the solvent-borne resin. One overcoat is a silicone-containing material. Alternatively, the overcoat can be an amine-containing material. One such amine-containing material is a Mannich-based modified aliphatic amine.

A strip of collated fasteners includes a plurality of fasteners connected to one another by a strip, each of the fasteners having a tip and a coating on each of the fasteners in the strip of fasteners, at least at the tip, the coating formulated from a solvent-borne resin, preferably, an acrylic resin.

These and other features and advantages of the present disclosure will be apparent from the following detailed description, in conjunction with the appended claims.

BRIEF DESCRIPTION OF THE DRAWING

FIG. 1 is an illustration of a sample board in which nails with the present coating and nails having a reference coating are shown as fired from a nail gun into a laminated strand lumber (LSL) substrate.

DETAILED DESCRIPTION

While the present disclosure is susceptible of embodiment in various forms, there is shown in the drawings and will hereinafter be described a presently preferred embodiment with the understanding that the present disclosure is to be considered an exemplification and is not intended to limit the disclosure to the specific embodiment illustrated.

Various ease-of-drive nail coating formulations are known. These formulations all have the goal of reducing the force needed to drive a nail into a substrate while at the same time not adversely affecting the holding power of the nail. And, as substrates become harder and more dense, it has become more difficult to drive fasteners using conventional power tools.

Coatings in accordance with the present disclosure have been shown to improve drivability in many substrates, including now available harder and more dense materials, such as LSL.

One known nail coating that has been observed to be quite successful in reducing the force needed to drive nails is a resin, such as an acrylic resin formulation, more specifically, an acrylic copolymer of butyl/methyl methacrylate present in a concentration of about 10.0 percent to about 30.0 percent by weight, a pigment, such as a black pigment or polyethylene dye present in a concentration of about 0 percent to about 2 percent, more preferably in a concentration of about 0.5 percent to about 1.5. Other suitable resins include polyurethane, polyester, alkyd, epoxy, phenolic, various amino, and vinyl or vinyl copolymers.

The formulation further includes a solvent, preferably an organic solvent. One suitable organic solvent is acetone, present in a concentration of about 60.0 percent to about 90.0 percent by weight, and more preferably in a concentration of about 75.0 percent to about 80.0 percent. The solvent may include other additives, such as isopropyl alcohol in a concentration of about 0 percent to about 5.0 percent, and preferably in a concentration of about 1.0 percent to about 3.0 percent. Other solvents that are contemplated to be suitable for the coating formulation include xylene, toluene, benzene, methyl ethyl ketone (MEK), butyl acetate and tertiary butyl acetate. It will also be appreciated that non-organic solvents, such as water may be suitable for the fastener coating formulation.

Optionally, the coating can include a solids additive to enhance drivability. One such additive is a polyolefin. One polyolefin is a micronized polypropylene, preferably in a concentration of about 0 percent to about 6 percent, and more preferably in a concentration of about 1.0 to about 4.0 percent and more preferably still in a concentration of about 2.0 percent to about 3.0 percent. All percentages are by weight of the weight of the coating formulation.

An exemplary acrylic resin is a thermoplastic having a molecular weight of greater than about 100,000 and preferably greater than about 200,000. One such thermoplastic resin is NeoCryl B723, commercially available from DSM NeoResins of Wilmington, Mass. Such a resin is a solvent-borne methacrylate resin having methyl and butyl functional groups, having a glass transition temperature of about 54° C. and an acid value of about 5.5. It is anticipated that other resins with glass transition temperatures of greater than about 40° C. and acid values of greater than about 4.0 will be suitable for the present application, however, other suitable resins with higher or lower glass transition temperatures and higher or lower acid values will be recognized by those skilled in the art.

One optional solids additive is a micronized polypropylene powder having a mean particle size of about 5 to about 50 microns. Exemplary polypropylene powders include Propylmatte 31 and Propyltex 200S, both commercially available from Micro Powders, Inc., of Tarrytown, N.Y.

Other solids additives that has been found to be suitable for the coating application are waxes. One suitable wax is a carnauba wax, such as a polytetrafluoroethylene (PTFE) modified carnauba wax. One such PTFE modified carnauba wax is Lanco Glidd 5518, commercially available from Lubrizol Corporation of Wickliffe, Ohio. Other suitable solids additives include other ground and/or micronized polymers, such as micronized polyolefins, such as polyethylene and the like.

Optionally still, an overcoat can be applied to the coating to further enhance the drivability of the fasteners. One such overcoat is a silicone-containing fluid, such as Johnson Wax Shine-Up, which is a wax containing an isoparaffinic hydrocarbon solvent in a concentration of about 10 percent to about 20 percent, butane in a concentration of about 1.0 percent to about 5.0 percent, propane in a concentration of about 1.0 percent to about 5.0 percent, isobutene in a concentration of about 1.0 percent to about 5.0 percent, silicone in a concentration of about 1.0 percent to about 3.0 percent, and water in a concentration of about 70 percent to about 80 percent, commercially available from S.C. Johnson Wax of Racine, Wis. A suitable wax overcoat has a viscosity of about 10,000 to about 45,000 cPs. All percents are weight percent of the overcoat. The wax overcoat is provided and can be applied as an aerosol or a liquid, the liquid being preferred.

Another optional overcoat is a Mannich-based modified aliphatic amine, such as Ancamine 1856, commercially available from Air Products and Chemicals, Inc. of Allentown, Pa. In a present formulation, the amine is diluted with acetone, about 15 percent by weight, prior to use. Other suitable overcoats will be understood by those skilled in the art.

It will be appreciated that various combinations of the additives and overcoats can be used to provide fasteners with enhanced drivability. For example, fasteners with the base coating formulation, e.g., resin in solvent with pigment, can be used, as can fasteners with the base coating with an overcoat be used, as can fasteners with the base coating and the solids additive be used.

The coating can be applied by dipping, spraying, brushing or other methods as will be recognized by those skilled in the art.

Samples of coated nails were tested to determine the affect of the present coatings. Tests were conducted on two (2) reference strips and ten (10) nail strips with top coating and/or solids additives. The strips are identified as Reference, Top Coat Effect and Particle Effect.

The two reference strips were a water-borne acrylic and the solvent-borne acrylic without solids additives or top coat (samples 1 and 2, respectively in the Table below). The Top Coat Effect strips included: (3) the solvent-borne acrylic with an overcoat of the Johnson Wax Shine Up; (4) the solvent borne-acrylic with 4.0 percent micronized polypropylene (Propylmatte 31); and (5) the solvent-borne acrylic with an overcoat of Ancamine 1856.

The Particle Effect strips included: (6) the solvent-borne acrylic with 1.0 percent micronized polypropylene (Propylmatte 31); (7) the solvent-borne acrylic with 2.0 percent micronized polypropylene (Propylmatte 31); (8) the solvent-borne acrylic with 4.0 percent micronized polypropylene (Propylmatte 31); (9) the solvent-borne acrylic with 2.0 percent micronized polypropylene (Propyltex 200S); (10) the solvent-borne acrylic with 4.0 percent micronized polypropylene (Propylmatte 31); (11) the solvent-borne acrylic with 4.0 PTFE-modified carnauba wax; and (12) the solvent-borne acrylic with 6.0 percent PTFE-modified carnauba wax.

The solvent-borne acrylic resin was formulated as NeoCryl B723 acrylic resin in a concentration of 19 percent by weight of the total coating formulation, black pigment (polyethylene dye) in a concentration of 0.7 percent by weight of the total coating formulation, acetone in a concentration of about 77 percent by weight of the total coating formulation, and iso-propanol in a concentration of about 2.0 percent by weight of the total coating formulation.

The tests were conducted using a strips of 3¼ inch long× 0.131 diameter nails. The nails were driven into the substrate by a pneumatic nailer with 120 psi compressed air. One strip of 34 nails of each of the samples was tested by driving the nails into laminated strand lumber (LSL).

The average height of each of the nails as compared to the average of the reference strip nails is provided in Table 1 below. The average height measurements in Table 1 are negative values in that the samples all exhibited a greater depth of penetration than the reference average. Viewed another way, the negative values indicate a greater depth of penetration of the samples compared to the water-borne acrylic reference (Sample No. 1).

TABLE 1

AVERAGE HEIGHT OF NAILS IN LVL LUMBER FOR VARIOUS COATINGS AND ADDITIVE CONCENTRATIONS

| Formulation | Sample No. | Avg. height vs. Ref. No. 1 (inches) |
| --- | --- | --- |
| Reference | 1 | 0 |
|  | 2 | −0.202 |
| Top Coat Effect | 3 | −0.234 |
|  | 4 | −0.248 |
|  | 5 | −0.226 |
| Particle Effect | 6 | −0.226 |
|  | 7 | −0.269 |
|  | 8 | −0.281 |
|  | 9 | −0.263 |
|  | 10 | −0.287 |
|  | 11 | −0.235 |
|  | 12 | −0.237 |

In that the average height values in Table 1 indicate the increased depth of the nails compared to the reference nails, it will be appreciated that a greater negative value correlates to the ease of drive or drivability of the nail. That is, the greater the value (absolute), the easier it was to drive that nail.

It is readily seen that there is a significant and substantial increase in the drivability of the coated nails generally, and a more significant increase in drivability of the higher concentration percentage of the polypropylene solids additive nail coating. And, although the Top Coat Effect proves to provide a nail with increased drivability, the results show that the higher concentration solids additive nails show a marked increase in drivability, even over a similar nail with an overcoat (−0.281 inches vs. −0.248 inches). Nevertheless, all of the present coated fasteners showed a marked increase in drivability over the reference, water-borne acrylic fastener coating formulation.

FIG. 1 is a board of laminated strand lumber (LSL) into which the nails were fired from the nail gun. The nails indicated by sample number 7 in the photograph are the reference nails of sample number 1 in Table 1 above.

All patents referred to herein, are incorporated herein by reference, whether or not specifically done so within the text of this disclosure.

In the disclosure, the words "a" or "an" are to be taken to include both the singular and the plural. Conversely, any reference to plural items shall, where appropriate, include the singular.

From the foregoing it will be observed that numerous modification and variations can be effectuated without departing from the true spirit and scope of the novel concepts of the present disclosure. It is to be understood that no limitation with respect to the specific embodiments presented is intended or should be inferred. The disclosure is intended to cover by the appended claims all such modifications as fall within the scope of the claims.

What is claimed is:

1. A coated fastener comprising:
a fastener having a tip;
a coating on the fastener, at least at the tip, the coating formulated from a solvent-borne resin;
wherein the solvent-borne resin is an acrylic resin and the solvent-borne resin includes a solids additive; and
wherein the solids additive is a micronized polypropylene.

2. The coated fastener in accordance with claim 1 wherein the acrylic resin is an acrylic copolymer of butyl/methyl methacrylate.

3. The coated fastener in accordance with claim 1 including an overcoat on the solvent-borne resin.

4. The coated fastener in accordance with claim 3 wherein the overcoat is a silicone-containing material.

5. The coated fastener in accordance with claim 1 including an overcoat on the solvent-borne resin with solids additive.

6. A coated fastener comprising:
a fastener having a tip; and
a coating on the fastener, at least at the tip, the coating formulated from a solvent-borne resin;
wherein the solvent-borne resin includes a solids additive;
wherein the solids additive is a polyolefin.

7. The coated fastener in accordance with claim 6 wherein the solids additive is a micronized polypropylene.

8. The coated fastener in accordance with claim 7 wherein the micronized polypropylene is a powder.

9. The coated fastener in accordance with claim 7 wherein the micronized polypropylene is present in a concentration of about 0 percent to about 6.0 percent by weight of the coating formulation.

10. A coated fastener comprising:
a fastener having a tip; and
a coating on the fastener, at least at the tip, the coating formulated from a solvent-borne resin;
wherein the solvent-borne resin is formulated in a solvent that is an organic solvent, wherein the solvent-borne resin is in a solvent that is at least in part, acetone and wherein the acetone is present in a concentration of about 75 percent to about 80 percent of the weight of the coating formulation.

11. A coated fastener comprising:
a fastener having a tip;
a coating on the fastener, at least at the tip, the coating formulated from a solvent-borne resin; and
an overcoat on the solvent-borne resin;
wherein the overcoat is an amine-containing material.

12. The coated fastener in accordance with claim 11 wherein the amine-containing material is a Mannich-based modified aliphatic amine.

13. The coated fastener in accordance with claim 11, wherein the solvent-borne resin includes a solids additive and wherein the solids additive is a wax.

14. The coated fastener in accordance with claim 13 wherein the wax is a carnauba wax.

15. The coated fastener in accordance with claim 14 wherein the carnauba wax is a modified carnauba wax.

16. The coated fastener in accordance with claim 15 wherein the modified carnauba wax is a PTFE modified carnauba wax.

17. The coated fastener in accordance with claim 16 wherein the PTFE modified carnauba wax is present in a concentration of about 0 percent to about 10.0 percent by weight of the coating formulation.

18. A coated fastener comprising:
a fastener having a tip; and
a coating on the fastener, at least at the tip, the coating formulated from a solvent-borne resin,
wherein the solvent-borne resin is formulated in a solvent that is an organic solvent, and wherein the solvent includes one or more of xylene, toluene, benzene, methyl ethyl ketone (MEK), butyl acetate and tertiary butyl acetate.

19. A strip of collated fasteners comprising:
a plurality of fasteners connected to one another by a strip, each of the fasteners having a tip;
a coating on each of the fasteners in the strip of fasteners, at least at the tip, the coating formulated from a solvent-borne resin that is an acrylic resin; and
a solids based additive in the solvent-borne acrylic resin;
wherein the solids based additive is a polyolefin.

20. The strip of collated fasteners in accordance with claim 19 further including an overcoat on the solvent-borne acrylic resin.

21. The strip of collated fasteners in accordance with claim 20 wherein the solvent-borne resin is in a solvent that is formulated from, at least in part, one or more of acetone, xylene, toluene, benzene, methyl ethyl ketone (MEK), butyl acetate and tertiary butyl acetate.

* * * * *